Patented Oct. 16, 1934

1,977,561

UNITED STATES PATENT OFFICE 1,977,561

SECONDARY-BUTYL-CARBINYL ETHYL BARBITURIC COMPOUND

Horace A. Shonle, Indianapolis, Ind., assignor to Eli Lilly and Company, Indianapolis, Ind., a corporation of Indiana No Drawing. Application July 23, 1930, Serial No. 470,246

3 Claims. (Cl. 260—33)

My invention has for its object the obtaining of a substance which possesses marked hypnotic activity combined with low toxicity, and relates to the production of the hitherto unknown hypnotic substance, an amyl ethyl barbituric acid, specifically identified under either of the names secondary-butyl-carbinyl ethyl barbituric acid or 2-methyl-butyl ethyl barbituric acid; and its intermediates and derivatives.

This particular amyl ethyl barbituric acid involves the broad invention set forth in my Patent No. 1,514,472, granted November 4, 1924, in that its distinguishing radical is a derivative of a barbituric-acid radical in which one of the carbon-linked hydrogen atoms is replaced by an ethyl radical and the other is replaced by an alkyl radical which has a branched chain in which a carbon atom intervenes between the barbituric-acid structure and the carbon atom at which the chain branches.

The particular amyl ethyl barbituric acid which is the specific subject of the present application exhibits pronounced soporific or hypnotic properties, and at the same time has low toxicity.

This new amyl ethyl barbituric acid possesses the structure:

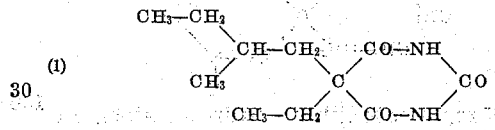

in which one of the hydrogen atoms attached to a nitrogen atom can be replaced by a monovalent metal, such, for instance, as sodium, or by an equivalent of a polyvalent metal, such, for instance, as calcium or magnesium, or by the ammonium ion, or by a mono- or di- substituted ammonium, such as —NH₃—CH₃ or —NH₂(C₂H₅)₂.

This new amyl ethyl barbituric acid may be produced by various processes. One of these consists in condensing urea with secondary-butyl-carbinyl ethyl malonic ester (or diethyl secondary-butyl-carbinyl ethyl malonate) in the presence of sodium ethylate, using substantially the following quantities, temperatures, and periods of time, although the product may still be obtained in varying yields even if these factors are changed:—

26.7 grams (3 moles) of metallic sodium are dissolved in from 300 to 500 grams of absolute alcohol, to which are added 100 grams (1 mole) of secondary-butyl-carbinyl ethyl malonic ester and 37.2 grams (1.6 mole) of urea. This mixture is heated in an autoclave for 4 to 6 hours at a temperature of about 105° C.

If preferred, such mixture may instead be heated in a container under a reflux condenser at atmospheric pressure in a boiling water bath for 20 to 40 hours.

The secondary-butyl-carbinyl ethyl barbituric acid formed by this condensation is present as its sodium salt. The mixture is then acidified with hydrochloric acid, and the alcohol removed by distillation. The crude secondary-butyl-carbinyl ethyl barbituric acid remains as a residue in the distilling flask.

If desired, the alcohol may instead first be removed from the mixture by distillation, the paste-like residue of the sodium salt of secondary-butyl-carbinyl ethyl barbituric acid then dissolved in cold water, and hydrochloric acid then added in excess; whereupon the crude secondary-butyl-carbinyl ethyl barbituric acid is precipitated.

This crude secondary-butyl-carbinyl ethyl barbituric acid may be purified by recrystallization from water, dilute alcohol, or benzene, to form white crystals, which melt at 136° to 138° C., corrected. This melting point is for the substantially pure acid, as obtained by repeated recrystallizations; for the substance when less pure, such as the crude barbituric acid initially obtained, has a lower melting point than that, depending upon the amount of impurities remaining. This barbituric acid, both in its substantially pure recrystallized form and in its less pure form with lower melting point as obtained by fewer recrystallizations or even by the direct condensation of the corresponding malonic ester with urea, is slightly soluble in cold water, more soluble in hot water, and easily soluble in alcohol and ether, and has a slightly bitter taste, and forms with the alkali metals salts which are readily soluble in water; and both the acid and the salts so formed, whether or not the acid is purified sufficiently to give a melting point as high as stated above, exhibit hypnotic action.

Since secondary-butyl-carbinyl ethyl barbituric acid possesses one nitrogen-linked hydrogen capable of being replaced with a monovalent metal, such as sodium, or with an equivalent of a polyvalent metal, such as magnesium, or with the ammonium ion, or with organic bases, it is possible to form salts of this acid. The acid and the salts may be represented by the following formula:

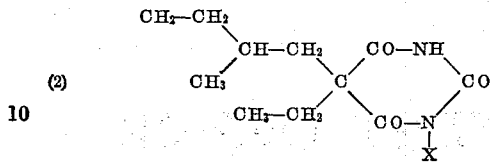

in which X represents either a hydrogen atom or an atom of a monovalent metal or an equivalent of a polyvalent metal or ammonium or a mono- or di-substituted ammonium. The sodium salt, which may be formed by treating one mole of secondary-butyl-carbinyl ethyl barbituric acid with one mole of sodium hydroxide in a suitable solvent, and concentrating until the solid salt is obtained, is readily soluble in cold water, and somewhat less soluble in absolute alcohol. This sodium salt has the following formula:

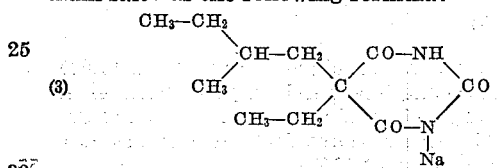

This sodium salt is efficacious for producing anaesthesia by intravenous injection. For this purpose it is desirably prepared in an anhydrous form, which may be done by the method of preparation set forth in my co-pending application Serial No. 373,051, filed June 22, 1929; which application is intended to cover generically such method of preparation and the resultant anhydrous salts.

The calcium and magnesium salts, which may be formed by adding one mole of secondary-butyl-carbinyl ethyl barbituric acid to a solution of a half mole of a calcium or magnesium compound, are less soluble than the sodium salt, the calcium salt being relatively insoluble in water. The ammonium salts or the substituted-ammonium salts, which may be made by dissolving one mole of secondary-butyl-carbinyl ethyl barbituric acid in a solution of a slight excess beyond one mole of ammonium hydroxide or of a primary or secondary alkyl amine, such as methyl amine or di-ethyl amine, and concentrating until the solid salt is obtained, are also water-soluble.

So far as I know, the secondary-butyl-carbinyl ethyl malonic ester used in the processes given above is a new product. It may be prepared by the following process:

12.5 grams (1 mole) of sodium are dissolved in 125 grams of absolute alcohol, and 100 grams (1 mole) of ethyl malonic ester are added. After standing a few minutes, about 75% to 90% of the absolute alcohol is then removed by vacuum distillation. The sodium salt of the ethyl malonic ester now remains in the flask in a pastry form. The flask containing this is now connected to a reflux condenser, and 85 grams (a slight excess above 1 mole) of secondary-butyl-carbinyl bromide (2-methyl-butyl bromide) are gradually added. After the resultant initial reaction subsides, the flask is heated in an oil bath under a reflux condenser at a temperature of approximately 125° C. for about an hour. The alcohol and excess secondary-butyl-carbinyl bromide are now distilled off, and water is added; and the layer of secondary-butyl-carbinyl ethyl malonic ester is separated, dried over calcium chloride, and fractionally distilled.

Secondary-butyl-carbinyl ethyl malonic ester boils at a pressure of 15 mm. of mercury, between 141° and 143° C. It has the formula:

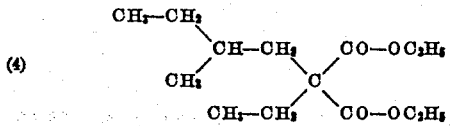

The secondary-butyl-carbinyl ethyl barbituric acid and the secondary-buytl-carbinyl ethyl malonic ester have in common a radical of the following formula:

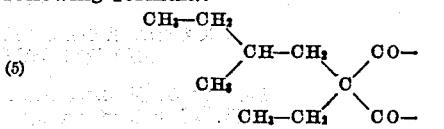

So far as I am aware, products containing this radical which is common to secondary-butyl-carbinyl ethyl barbituric acid and to secondary-butyl-carbinyl ethyl malonic ester have not hitherto been known.

The secondary-butyl-carbinyl ethyl barbituric acid, and its salts, and the secondary-butyl-carbinyl ethyl malonic ester, may all be either racemic mixtures or optically active compounds, and in the latter case may be either dextro-rotatory or laevo-rotatory, depending upon the character of the secondary-butyl-carbinyl bromide used, as that character is considered from the point of optical activity. That is, if that secondary-butyl-carbinyl bromide is racemic, the ultimate barbituric acid or malonic ester or salt will be racemic; while if such bromide is optically active, the final barbituric acid or malonic ester or salt will likewise be optically active, dextro or laevo as the case may be.

The proportions used are the same regardless of this optical character of the bromide used; but the figures given regarding melting points and boiling points are those which are obtained with racemic products, derived by the use of racemic secondary-butyl-carbinyl bromide.

I claim as my invention:
1. The new substances, which are represented by the formula:

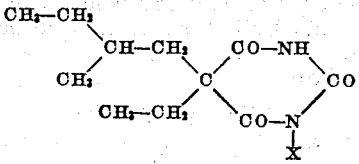

wherein X represents either a hydrogen atom, an atom of an alkali metal, or an equivalent of an alkaline-earth metal, or the ammonium ion, or a mono- or di-alkyl ammonium radical.

2. The new substance, sodium secondary-butyl-carbinyl ethyl barbiturate, which is represented by the formula:

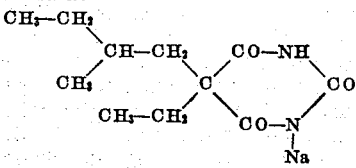

3. A 2-methyl-butyl ethyl barbituric acid of the following general formula:

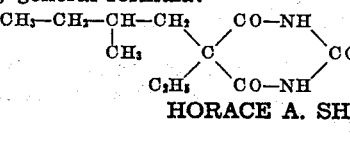

HORACE A. SHONLE.